United States Patent
Steiner

(10) Patent No.: US 8,058,916 B2
(45) Date of Patent: Nov. 15, 2011

(54) LOCKSTEP SYNCHRONIZATION AND MAINTENANCE

(75) Inventor: Glenn C. Steiner, Los Altos, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 12/761,035

(22) Filed: Apr. 15, 2010

(65) Prior Publication Data

US 2011/0254602 A1 Oct. 20, 2011

(51) Int. Cl.
*H03L 7/06* (2006.01)
(52) U.S. Cl. .......................................... 327/156; 327/147
(58) Field of Classification Search .................. 327/147, 327/156

See application file for complete search history.

(56) References Cited

U.S. PATENT DOCUMENTS

| | | | |
|---|---|---|---|
| 5,384,906 A | 1/1995 | Horst | |
| 5,455,935 A | 10/1995 | Taylor et al. | |
| 6,449,728 B1 | 9/2002 | Bailey | |
| 6,693,494 B2 * | 2/2004 | Fan | 331/17 |
| 6,718,473 B1 * | 4/2004 | Mirov et al. | 713/320 |
| 7,225,355 B2 | 5/2007 | Yamazaki et al. | |
| 7,436,264 B2 * | 10/2008 | Yu | 331/17 |
| 7,576,576 B2 * | 8/2009 | Drexler et al. | 327/156 |
| 2003/0034846 A1 * | 2/2003 | Fan | 331/17 |
| 2005/0030071 A1 | 2/2005 | Nguyen et al. | |
| 2005/0083099 A1 * | 4/2005 | Lin | 327/295 |
| 2006/0001494 A1 * | 1/2006 | Garlepp et al. | 331/2 |
| 2007/0103214 A1 * | 5/2007 | Drexler et al. | 327/156 |

FOREIGN PATENT DOCUMENTS

| | | |
|---|---|---|
| EP | 0 747 803 A2 | 12/1996 |
| EP | 1 271 284 A2 | 1/2003 |
| GB | 2 317 282 A | 3/1998 |

OTHER PUBLICATIONS

Taylor, Brad and Wittig, Ralph, "28nm Generation Programmable Families", 7 Series FPGAs, Extensible Processing Platform Family, AMBA AX14 IP, Aug. 8, 2010, pp. 1-25, Xilinx, 2100 Logic Drive, San Jose, CA 95124.

Nass, Rich, "Xilinx puts ARM Core into its FPGAs", EE Times, 2 pp., Apr. 27, 2010, available at http://www.eetimes.com/electronics-products/processors/4115523/Xilinx-puts-ARM-core-into-its-FPGA.

* cited by examiner

*Primary Examiner* — Lincoln Donovan
*Assistant Examiner* — Adam Houston
(74) *Attorney, Agent, or Firm* — LeRoy D. Maunu; Thomas George

(57) ABSTRACT

A method and circuit are provided for synchronizing a first circuit and a second circuit. The first and second circuits are signaled to each generate respective waveform outputs. A phase difference is determined between the generated waveform output from the first and second circuits. A clock of the first circuit and/or second circuit is adjusted by an amount corresponding to the determined phase difference. In response to the phase difference being less than a threshold value, the first and second circuits are signaled to begin normal operation.

20 Claims, 13 Drawing Sheets

LOCKSTEP SYNCHRONIZATION AND MAINTENANCE

FIELD OF THE INVENTION

An embodiment of the present invention generally relates to synchronous circuits.

BACKGROUND

Many processing systems require separate circuits that perform synchronized operations with one another. For example, in systems requiring a high degree of reliability, redundant circuits are often implemented to operate in parallel and are synchronized in a lockstep manner. Lockstep is a technique used to monitor and verify the operation of a system. In processor lockstep, two processors are synchronized to the same state during system start-up. Following synchronization, the state of the two processors is identical from clock cycle to clock cycle. While processors are operating in identical states they are said to be operating in lockstep. The processors receive identical input and the output of each processor is monitored and compared. If a difference between the output of the processors is encountered, an error is detected and mitigation techniques can be employed.

Lockstepping may also be employed in other situations. For example, in a shared memory multiprocessor System-on-Chip (SoC), two or more processors operate on a common set of data stored in a shared memory. For the processors to work properly, lockstep synchronization is commonly employed to control access to the shared memory.

One problem encountered in lockstep synchronization is the synchronization of clock signals used by two or more synchronized circuits. If synchronized circuits use separate clocks, the clocks must be synchronized to initialize the circuits into a common state. Even when driven by a common clock, generated signals may arrive at different components at different times due to: different lengths of signal lines; material imperfections; or variations in temperature, capacitance, and intermediate devices. Even after synchronization is achieved, clock signals are not perfectly stable and tend to differ after some amount of time. This is known as clock drift. Even after clocks are synchronized, processor instruction executions must also be synchronized. Thus, as part of the synchronization process processor instructions must be synchronized.

As clock signal frequencies employed in integrated circuitry increases, it becomes more difficult to synchronize and maintain lockstep. With processors operating in the gigahertz range and source oscillators operating at a fraction of the processor frequency it is difficult to align two or more processors in lockstep. Should the processors be physically separated, silicon and board delays can compound the problem.

One or more embodiments of the present invention may address one or more of the above issues.

SUMMARY

In one embodiment of the invention, a circuit is provided to synchronize a first processor and a second processor. The circuit includes a first phase comparator having a first input coupled to an output of the first processor and a second input coupled to an output of the second processor. A first phase-locked loop circuit having an input coupled to a clock source generator, an output coupled to a clock input of the first processor, and a control input coupled to an output of the phase comparator are also included in the circuit. The first phase comparator is configured to selectably operate in a first mode and a second mode.

While operating in the first mode, the first phase comparator determines a first phase difference between synchronization waveforms is output from the first and second processors and outputs a signal indicative of the first phase difference to the control input of the first phase-locked loop circuit. In response to the first phase difference being less than a selected value, the first phase comparator outputs a signal to the first and second processors indicating the first and second processors are synchronized and enters the second mode. While operating in the second mode, the phase comparator determines a second phase difference between signals received by the first and second inputs. In response to the second phase difference being less than a selected value, the phase comparator outputs a signal to the first and second processors indicating the first and second processors are synchronized.

In another embodiment, a system is provided for synchronizing multiple circuits. The system includes a phase comparator, a first circuit, and a second circuit. The first circuit has a plurality of outputs, including one or more outputs coupled to a first set of inputs of the phase comparator. The second circuit has a plurality of outputs, including one or more outputs coupled to a second set of inputs of the phase comparator. The system further includes a timing adjustment circuit coupled to one or more inputs of the first circuit. The phase comparator determines a time-offset difference between the first set of inputs and the second set of inputs. The phase comparator outputs the time-offset difference to the timing adjustment circuit. The timing adjustment circuit adjusts a signal output to the one or more inputs of the first circuit in response to the phase difference.

In yet another embodiment, a method is provided for synchronizing a first circuit and a second circuit. The first and second circuits are signaled to each generate respective waveform outputs. A phase difference is determined between the generated waveform output from the first and second circuits. A clock signal of the first circuit is adjusted by an amount corresponding to the determined phase difference. In response to the phase difference being less than a threshold value, the first and second circuits are signaled to begin normal operation.

It will be appreciated that various other embodiments are set forth in the Detailed Description and Claims which follow.

BRIEF DESCRIPTION OF THE DRAWINGS

Various aspects and advantages of one or more embodiments of the invention will become apparent upon review of the following detailed description and upon reference to the drawings in which.

DETAILED DESCRIPTION

Synchronous processing systems often require multiple circuits or processors to be operated in lockstep. Lockstep operation requires the clock used by each circuit or processor to be initially synchronized. Synchronization must then be maintained during lockstep operation. Various embodiments of the invention monitor one or more outputs of two circuits to be synchronized and determine a phased difference between the outputs. In one embodiment, a phase comparator circuit is used to compare outputs of two processors to be synchronized and determine a phase difference that is used to adjust the clock used by one or both of the processors.

Figure 1:
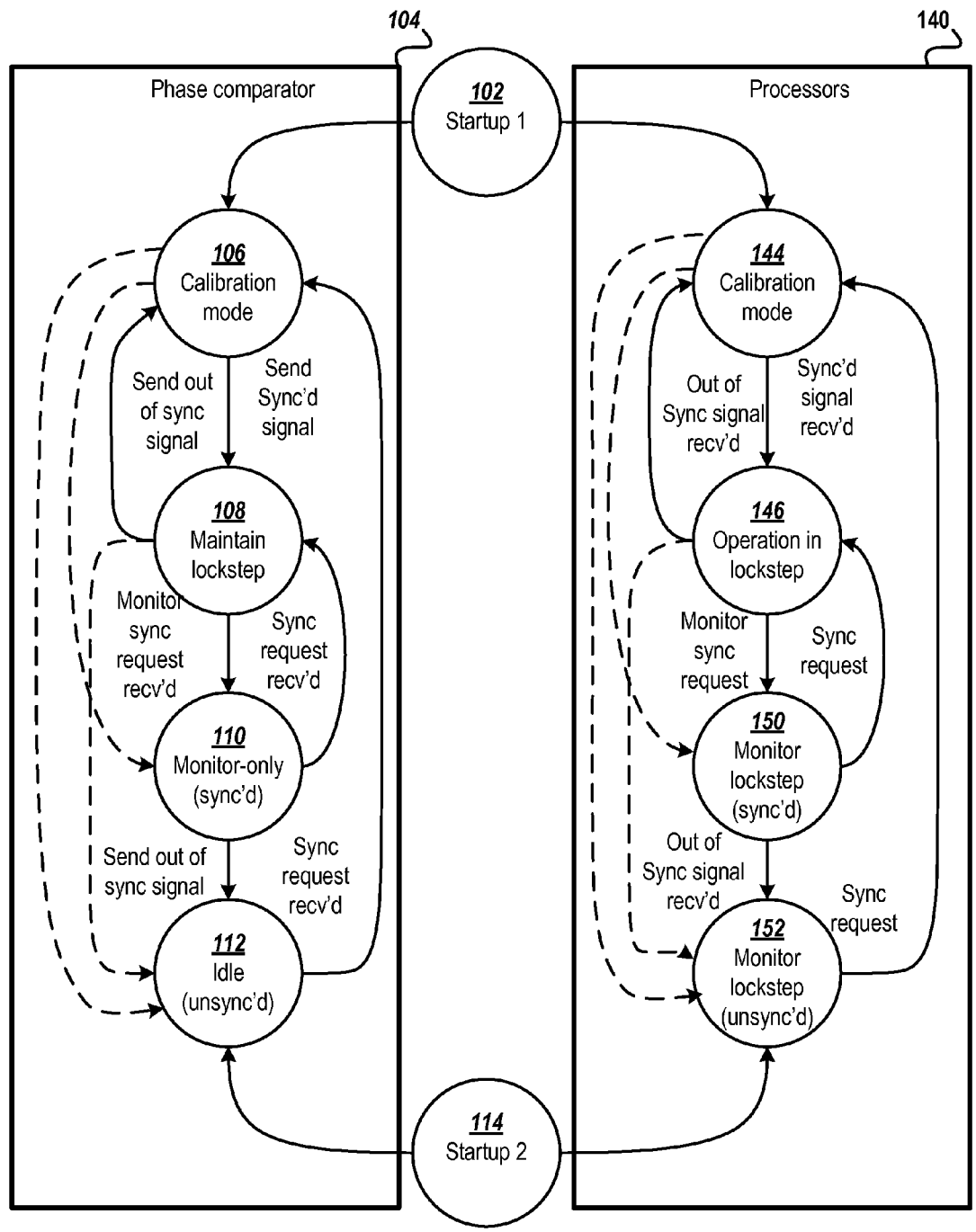
FIG. 1 shows a flowchart of an example state diagram implemented by processors and comparator circuits in accordance with various embodiments of the invention.

FIG. 1 shows a flowchart of an example state diagram implemented by processors and phase comparator circuits in accordance with various embodiments of the invention. At startup 102, the processors 140 and the phase comparator 104 enter respective calibration-mode states 144 and 106. While in the calibration-mode, processors 140 generate synchronization waveforms. The phase comparator 104 receives and compares at least one output of each processor to determine a phase difference between the processor outputs. Phase comparator 104 adjusts the clock signal used by one of the processors based on the phase difference to perform synchronization. Once synchronized, phase comparator 104 notifies the processors 140 that they are synchronized and transitions to maintain-lockstep state 108.

After processors 140 receive synchronization notification, the processors transition to operation-in-lockstep state 146. While in state 146, processors 140 proceed with normal lockstep processor operation. While processors 140 are operating in state 146, phase comparator operates in a maintain-lockstep state 108. While in maintain-lockstep state, phase comparator monitors at least one output of each processor 140 and compares the output to determine phase difference. Phase comparator 104 adjusts the clock signal used by one of the processors based on the phase difference to maintain lockstep synchronization.

If the determined phase difference is greater than a selected value, in some implementations the phase comparator signals the processors to indicate that the processors are out of synchronization and transitions back to calibration-mode state 106. This triggers processors 140 to transition to calibration-mode state 144 as well. The selected value may be pre-set or supplied via a register from a processor or other digital source.

In some embodiments, the processors 140 can signal each other and phase comparator 104, and transition to a monitor-synchronization mode as shown by states 150 and 152 in this example. When a request to operate in monitor-synchronization is received by phase comparator 104, the phase comparator enters monitor-only state 110. In this state, the phase comparator continues to monitor the output and notifies the processors if they go out of synchronization. Processors transition to unsynchronized state 152 if unsynchronized notification is received.

If one of the processors 140 needs to operate in synchronized mode while in state 150 or 152, the processor generates a synchronization request. If the processors 140 are in monitor-lockstep unsynchronized state 152, the processors 140 and phase comparator 104 return to respective calibration-mode states 144 and 106. If the processors 140 are in monitor-lockstep synchronized state 150, processors 140 and phase comparator 104 return to respective operation in lockstep 146 and maintain-lockstep 108 states.

In some implementations, the phase comparator may stop monitoring and operate in idle state 112 after the processors are determined to be out of synchronization. In some embodiments, states 110 and 112 are referred to as single mode or state.

In one embodiment, phase comparator will enter idle state 112 from maintain-lockstep state 108, and processors 140 will enter monitor-lockstep state 152, when the monitor-synchronization request is sent or received.

In another embodiment, phase comparator 104 and processors 140 respectively enter monitor-only state 110 and monitor-lockstep state 150 from calibration-mode states 106 and 140 after processors are synchronized.

In another embodiment, phase comparator 104 and processors 140 respectively enter idle state 112 and monitor-lockstep state 152 from calibration-mode states 106 and 140 after processors are synchronized.

In yet another embodiment, phase comparator and processors enter respective idle 112 and monitor-lockstep 152 states from startup state 114. In this embodiment processors operate out of synchronization until one processor generates a synchronization request. When a synchronization request is generated, processors 140 and phase comparator 104 enter respective calibration-mode states 144 and 106.

Figure 2:
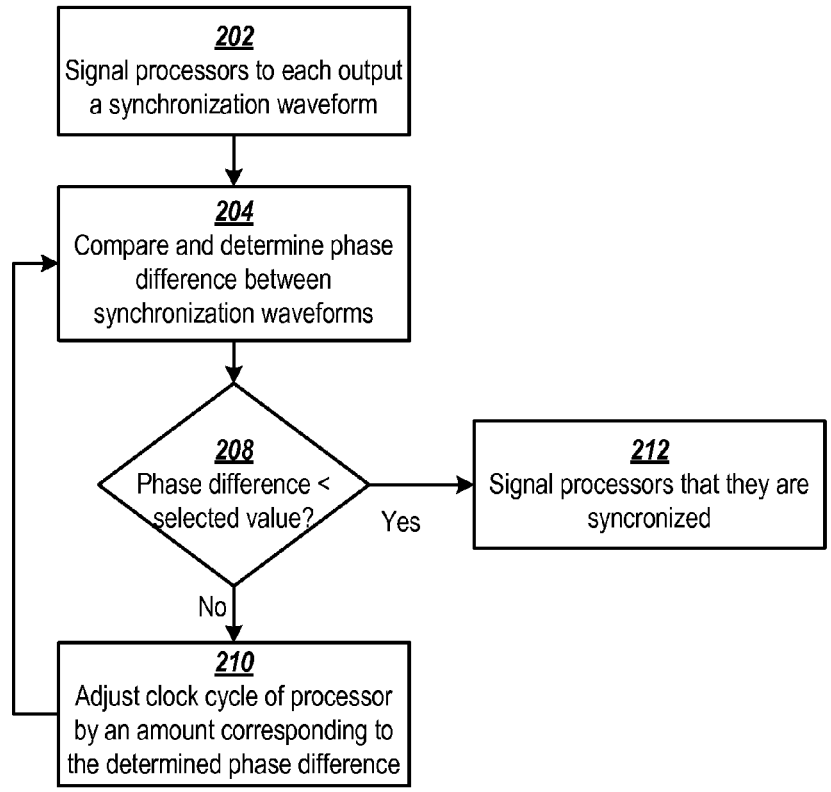
FIG. 2 shows a flowchart of a process for the synchronization of processors while in a calibration mode.

FIG. 2 shows a flowchart of an example process for the synchronization of processors while in a calibration mode. Processors are signaled to generate and output selected synchronization waveforms at step 202. A phase difference is determined between the synchronization waveforms at step 204. If the determined difference is less than a selected value at decision step 208, the processors are considered synchronized and a signal notifying processors of the synchronization status is sent at step 212. If the determined difference is greater than or equal to a selected value at decision step 208, the clock signal used by one of the processors is adjusted based on the phase difference at step 210. Following adjustment of the clock signal, the process of generating waveforms and determining phase is repeated until the processors are synchronized.

Adjustment may be performed by outputting the phase difference to a control input of a phase-locked loop (PLL) circuit which generates a clock signal that is input to one or more of the processors. In some implementations, the processor may have an internal phase-locked loop that may be adjusted via a control input of the processor.

Figure 3:
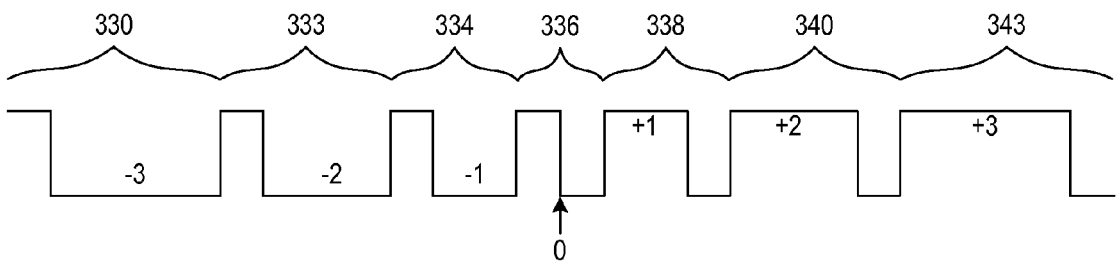
FIG. 3 shows an example synchronization waveform that may be used in accordance with various embodiments of the invention.

By generating and outputting unique synchronization waveforms, a phase difference is more easily determined. A number of different synchronization waveforms may be used such as a square wave or binary coded digit. FIG. 3 shows an example synchronization waveform that may be used in accordance with various embodiments of the invention for synchronization. The example waveform comprises several sub-waveforms 330, 333, 334, 336, 338, 340, and 343. Each sub-waveform has a high or low portion and has a duration of a unique number of unit cycles. Center sub-waveform 336 has a high portion and a low portion with a one unit cycle duration. Following the waveform in one direction, the duration of the high portion is extended by one unit each subsequent sub-waveform as shown by 338, 340, and 343. Following the waveform in the other direction, the duration of the low portion is extended by one unit each subsequent sub-waveform as shown by 334, 333, and 330. The distance from the center sub-waveform 336 can be determined by the duration of the high and low portions of the sub-waveform. The shortest direction to the center sub-waveform 336 is also indicated by the portion (e.g. the high portion of the low portion) of the sub-waveform that has the extended duration.

In one embodiment, synchronization is achieved during calibration mode without generating synchronization waveforms. In this embodiment, one or more data outputs of the processors are compared to determine a phase difference. Shift registers and comparators may be used to buffer data output for comparison and analysis.

Figure 4:
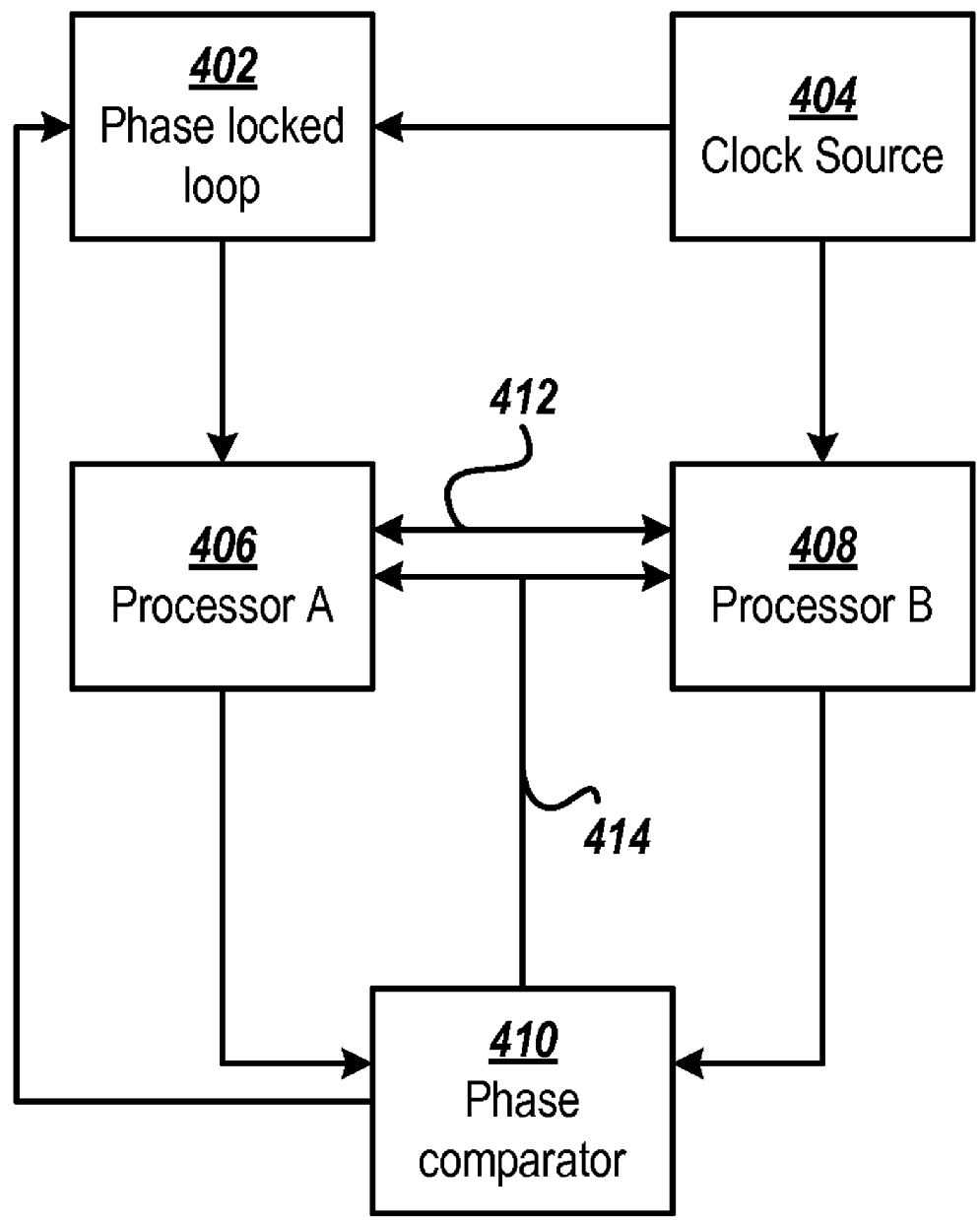
FIG. 4 shows a circuit for synchronization of processors in accordance with various embodiments of the invention.

FIG. 4 shows a circuit for synchronization of processors in accordance with various embodiments of the invention. In this example, a common clock signal is generated by clock source 404 and output to processor A 406 and processor B 408. A phased locked loop 402 is provided between clock source 404 and processor A 406 for adjusting the clock input to processor A 406. An output of each processor is input to phase comparator circuit 410. The phase comparator determines differences between output generated by processors 406 and 408. Signal line 412 is provided for communication requests to operate in synchronized or unsynchronized modes. A second signal line 414 is provided for communication of synchronization status from the phase comparator 410 to processors 406 and 408.

Figure 5:
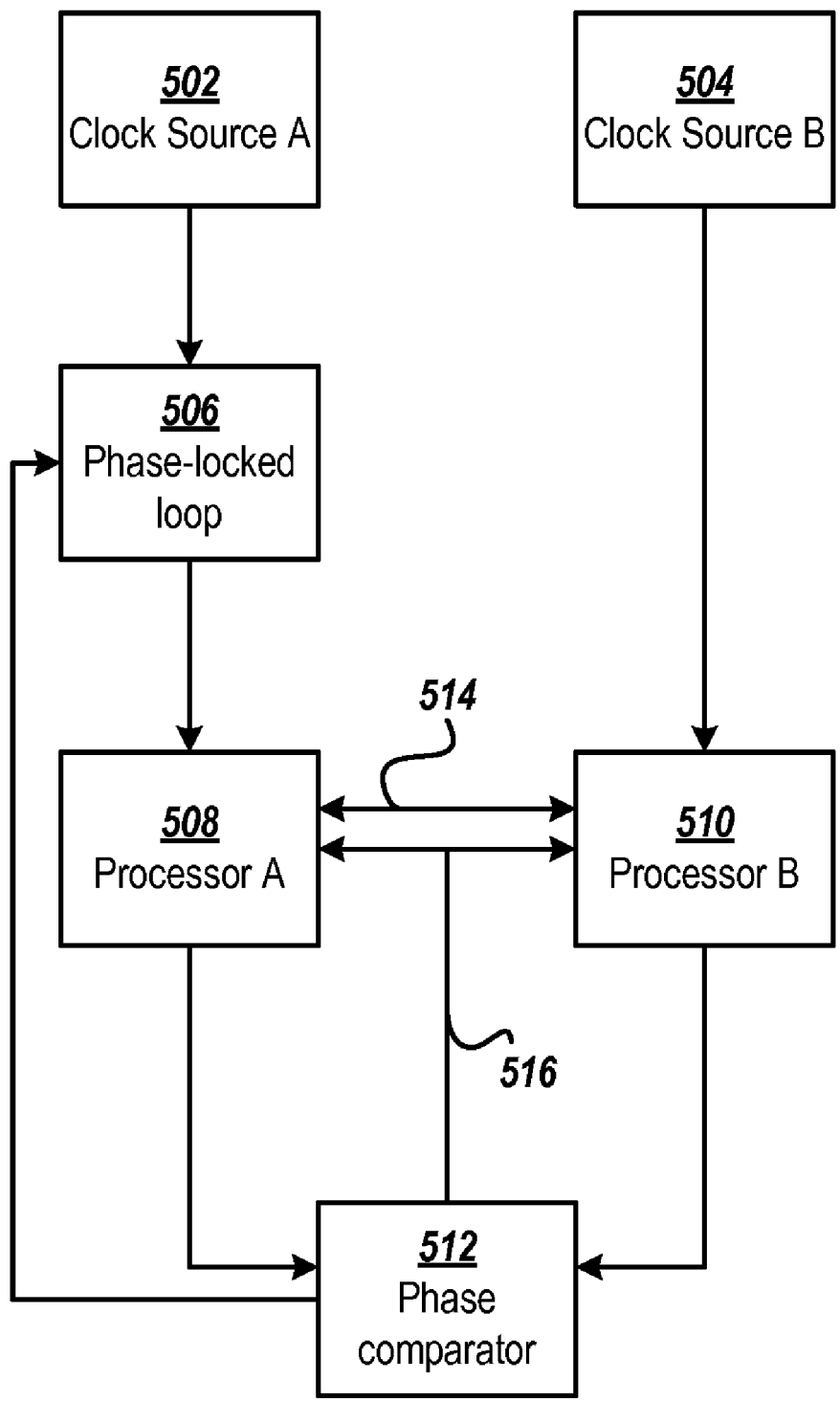
FIG. 5 shows an example circuit configuration for synchronization of processors driven by separate clock signal sources in accordance with various embodiments of the invention.

In one embodiment, processors driven by separate clock sources may be synchronized. FIG. 5 shows an example circuit configuration for synchronization of processors driven by separate clock sources in accordance with various embodiments of the invention. In this example, a first clock signal generated by clock source A 502 and a second clock signal generated by clock source B 504 are used to respectively drive processor A 508 and processor B 510. Phase-locked loop 506 is used to adjust the clock that is input to processor A 508. An output of each processor is input to phase comparator circuit 512. The phase comparator determines differences between output generated by processors 508 and 510, and outputs the determined phase difference to phase-locked loop 506. Signal line 514 is provided for communication requests to operate in synchronized or unsynchronized modes. A second signal line 516 is provided for communication synchronization status from the phase comparator 512 to processors 508 and 510.

In some implementations, the clock signal frequency of only one of the processors is adjusted to keep pace with the other processor, which is not adjusted.

Alternatively, two compared processors may each be adjustable. In such implementations, either processor can be adjusted to bring it into lockstep with the other processor. If one processor falls behind the other and cannot be driven any faster, the other processor can be slowed down to bring the two into synchronization.

Figure 6:
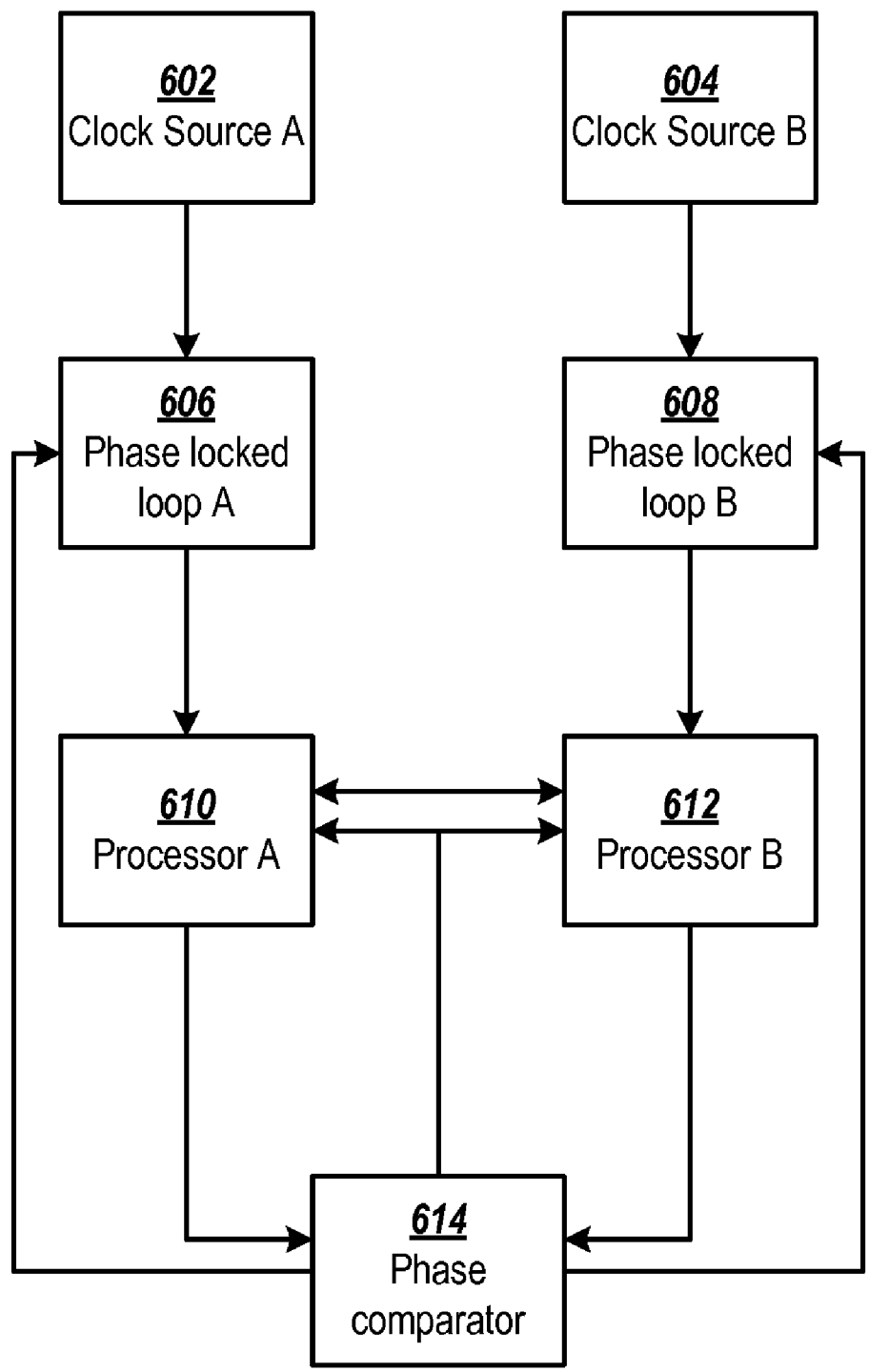
FIG. 6 shows an example circuit configuration for synchronization with adjustable phase-locked loops associated with each processor.

FIG. 6 shows a configuration with adjustable phase-locked loops implemented on both processors. In this example, a first clock signal generated by clock source A 602 and a second clock signal generated by clock source B 604 are used to respectively drive processor A 610 and processor B 612. Phase-locked loops A 606 and B 608 are used to respectively adjust the clock signals input to processors A 610 and B 612. An output of each processor is input to phase comparator circuit 614.

The phase comparator determines differences between output generated by processors 610 and 612 and outputs a phase difference to one of the phase-locked loop circuits 606/608. In some implementations, the phase comparator may adjust both phase locked loop circuits to bring the processors into synchronization in a shorter period of time. For example, after phase comparator 614 determines the phase difference of the output of processors 610 and 612, the phase comparator may split the difference and adjust each processor accordingly. In this manner, synchronization should occur in half the time that would be necessary if only one processor is adjustable.

Figure 7:
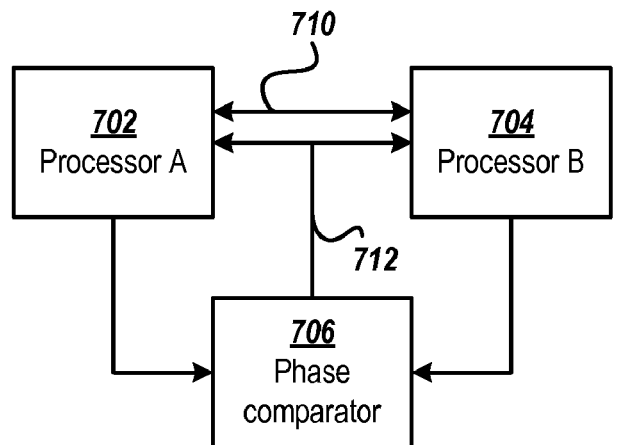
FIG. 7 shows a block diagram of a circuit illustrating one signaling arrangement between two processors and a phase comparator.

A number of different signaling arrangements may be used to communicate synchronization requests generated by the processors and the synchronization status determined phase comparator in accordance with various embodiments of the invention. For example, FIG. 7 shows a block diagram of a circuit illustrating one signaling arrangement between two processors and a phase comparator. Processor A 702 is coupled to processor B 704 with signal line 710. Phase comparator 706 is coupled to processors A 702 and B 704 with a second signal line 712. In operation, signal line 710 may be used to communicate synchronization requests between processors. For example, if processor A 702 determines it requires synchronized operation, is can generate a signal on line 712. As a result, the processors may generate synchronization waveforms to assist in lockstep configuration. Phase comparator can indicate whether the processors are synchronized via signal line 712.

Figure 8:
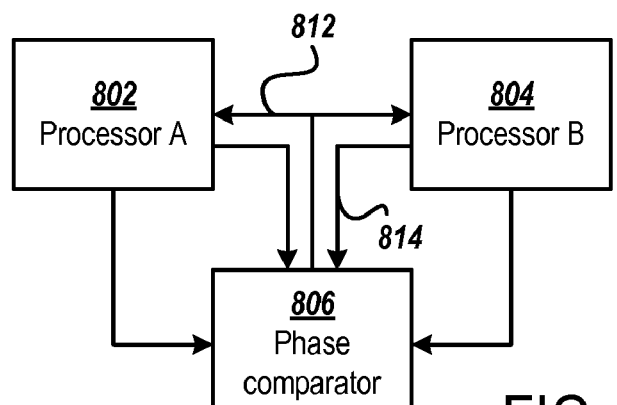
FIG. 8 shows a block diagram of a circuit illustrating another signaling arrangement between two processors and a phase comparator.

FIG. 8 shows a block diagram of a circuit illustrating another signaling arrangement between two processors and a phase comparator. In this example configuration, Processor A 802 and processor B 804 are coupled to phase comparator 806 with signal lines 814 and 812. In operation, signal lines 814 may be used to communicate synchronization requests to the phase comparator 806 individually. Phase comparator can signal processors A 802 and B 804 to output synchronization waveforms over signal line 812. Signal line 812 can also be used indicate whether the processors are synchronized.

Figure 9:
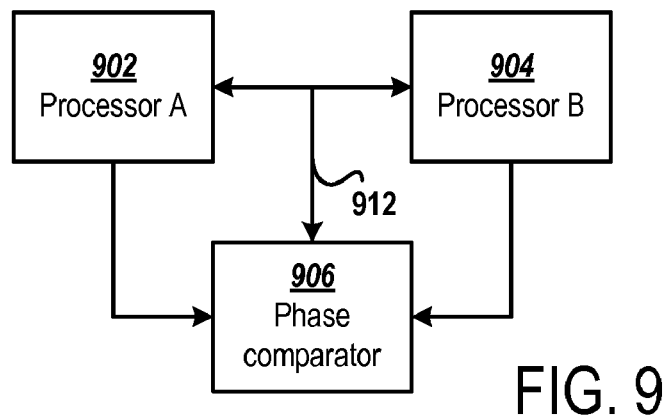
FIG. 9 shows a block diagram of a circuit illustrating yet another signaling arrangement between two processors and a phase comparator.

FIG. 9 shows a block diagram of a circuit illustrating yet another signaling arrangement between two processors and a phase comparator. In this example configuration, Processor A 902 and processor B 904 are coupled to phase comparator 906 with signal lines 914 and 912. In this configuration, a bidirectional signal-bus 916 can be used to communicate signals between processor A 902, processor B 904, and phase comparator 906. This configuration is helpful when a designer wants generated signals to be visible to the processors and the phase comparator.

Some embodiments of the invention utilize phase-locked loop circuitry internal to a processor for synchronization. Many processors include phase-locked loop circuitry internally to regulate the operating speed of the processor. In many of these processors, the phase-locked loop can be adjusted through an externally accessible control port.

Figure 10:
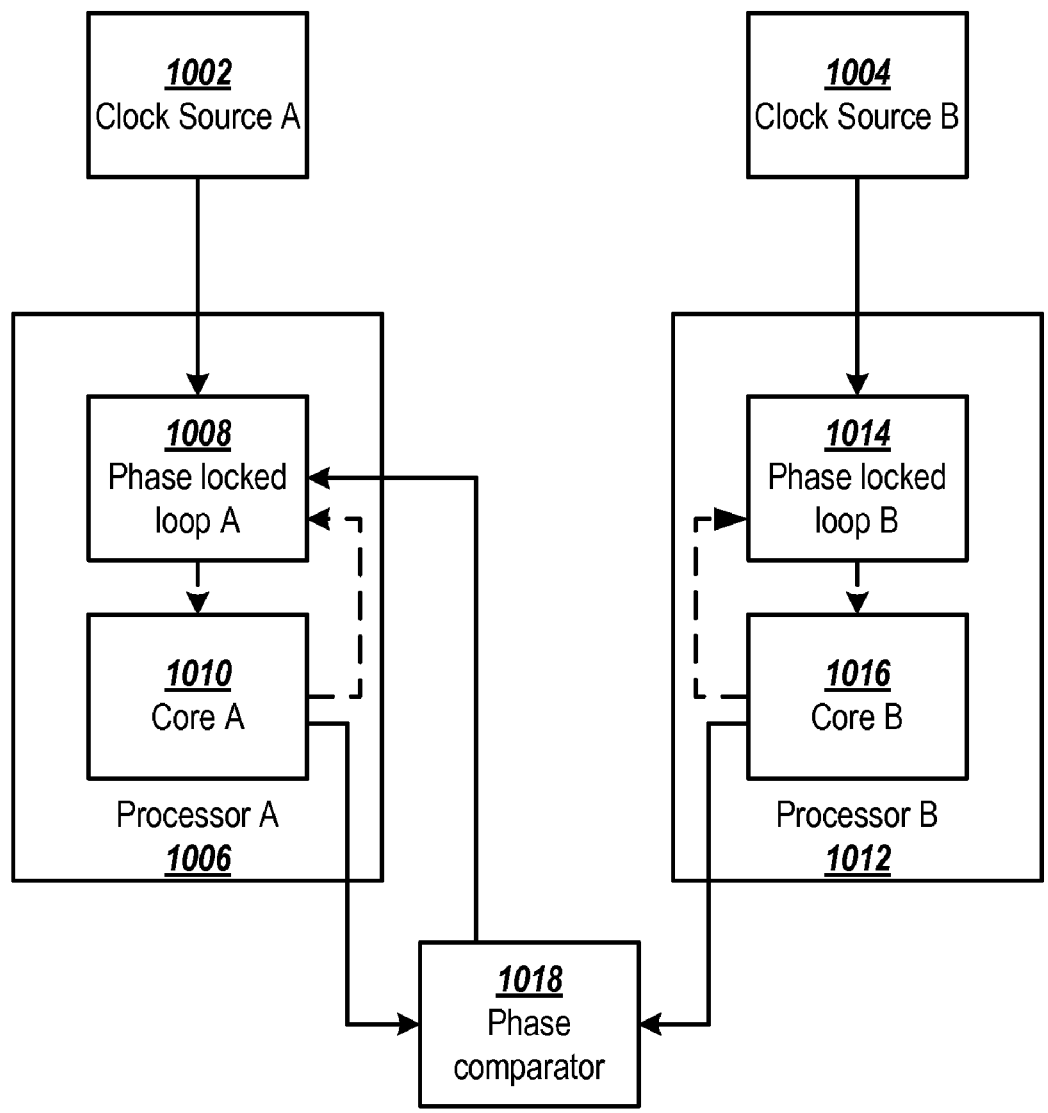
FIG. 10 shows a circuit configuration for synchronization of processors with internal phase-locked loop circuitry in accordance with various embodiments of the invention.

FIG. 10 shows an example circuit configuration for synchronization of processors with internal phase-locked loop circuitry in accordance with various embodiments of the invention. In this example, a first clock signal generated by clock source A 1002 and a second clock signal generated by clock source B 1004 are used to respectively drive processor A 1006 and processor B 1012. Processors A and B include respective processor cores 1010 and 1016 and phase-locked loop circuits 1008 and 1014. In each processor, the frequency of the clock signal input is adjusted by the phase locked loop circuit and output to the processor core. One or more outputs of each processor 1006 and 1012 are coupled to inputs of phase comparator 1018. Phase comparator 1018 determines a phase difference between the one or more outputs of the processors and outputs a phase difference to a control input of one or both phase lock loop circuits 1008 and/or 1014 to adjust the processor speed as discussed in the various embodiments above.

Figure 11:
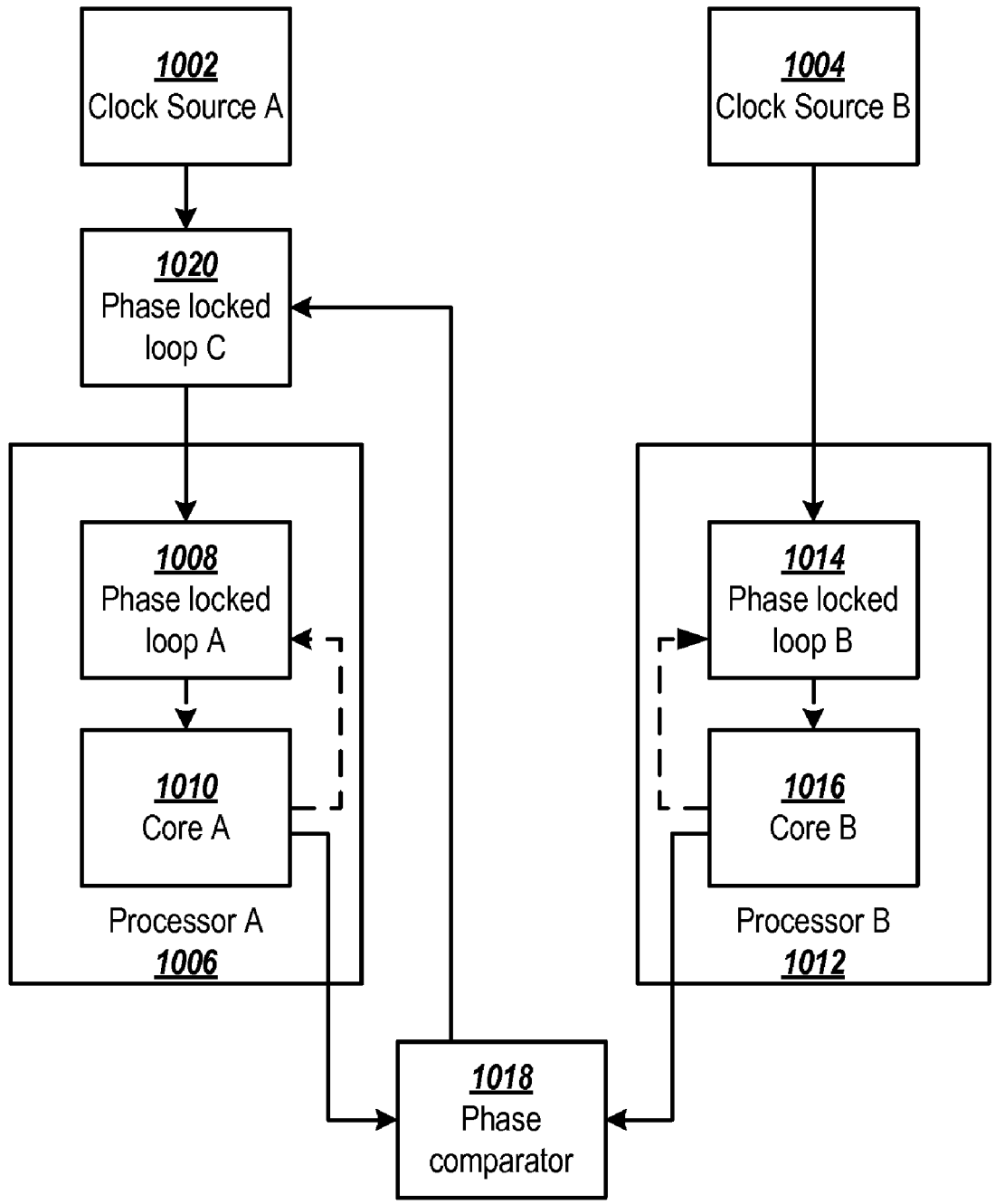
FIG. 11 shows the circuit configuration for synchronization of processors with internal phase-locked loop circuitry shown in FIG. 10 with external phase-locked loop circuitry for clock signal adjustment in accordance with various embodiments of the invention.

In some processors, internal phase-locked loop circuitry is included and is not adjustable by an external control. In such cases, external phase-locked loop circuitry can be used to bring the processors into lockstep. FIG. 11 shows the circuit configuration for synchronization of processors with internal phase-locked loop circuitry shown in FIG. 10 with an external phase-locked loop circuit 1020 added to adjust the clock signal input to processor A 1006. In this example, the first clock signal generated by clock source A 1002 is received by phase-locked loop circuit 1020. The phase lock loop circuit 1020 has a control input coupled to an output of the phase comparator 1018. The phase locked loop circuit 1020 adjusts the received clock signal based on the determined phase difference and outputs the resulting clock signal to processor A 1006.

In some processors, internal phase-locked loop circuitry is included and is not easily adjustable by an external clock source. In these processors, adjusting a clock signal input to the processors with external phase-locked loops may not allow sufficient control of processor speed to bring two processors into synchronization.

Figure 12:
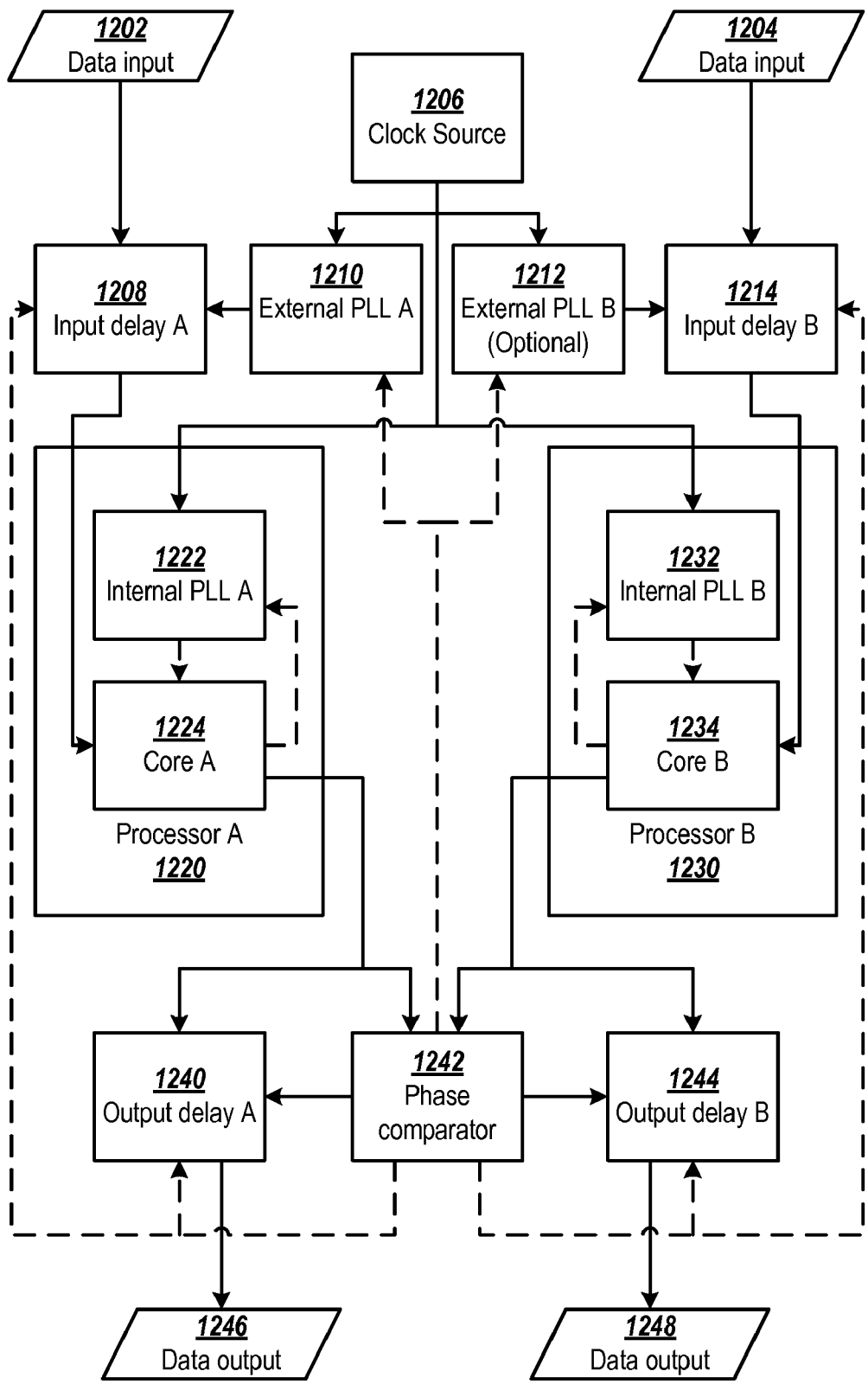
FIG. 12 shows an example circuit configuration for synchronization of processors using delay circuits on critical inputs and outputs in accordance with various embodiments of the invention.

In one embodiment of the invention, processors can be brought into alignment by using adjustable delay circuits on critical inputs to adjust the speed of respective processors. In another embodiment, adjustable delay circuits are used on critical inputs and critical outputs to adjust processor speed and achieve synchronization. Semaphore type messaging may also be used in conjunction with delay circuits to synchronize processors. FIG. 12 shows an example circuit configuration for synchronization of processors using delay circuits on critical inputs and outputs in accordance with various embodiments of the invention. In this example, a clock signal generated by clock source 1206 is used to drive processors A 1220 and B 1230.

Processors A and B include respective processor cores 1224 and 1234 and phase-locked loop circuits 1222 and 1232. In each processor, the clock signal input from clock source 1206 is adjusted by the phase locked loop circuit and output to the processor core. One or more outputs of each processor 1220 and 1230 are coupled to inputs of phase comparator 1242. Phase comparator 1242 determines a phase difference between the one or more outputs of the processors and outputs a phase difference to output delay circuit 1240 and 1244 and/or input delay circuits 1208 and 1214. The determined phase difference may be input to delay circuits directly as shown to output delay circuit 1240 and 1244. Alternatively, the determined phase difference may be used to adjust a clock signal input to delay circuits as shown by external phase-locked loop circuits 1210 and 1212 coupled to a clock signal input of input delay circuits 1208 and 1214.

Although the various embodiments of the present invention are described primarily with respect to the synchronization of two processors, the various embodiments may be used to synchronize any number of processors.

Figure 13:
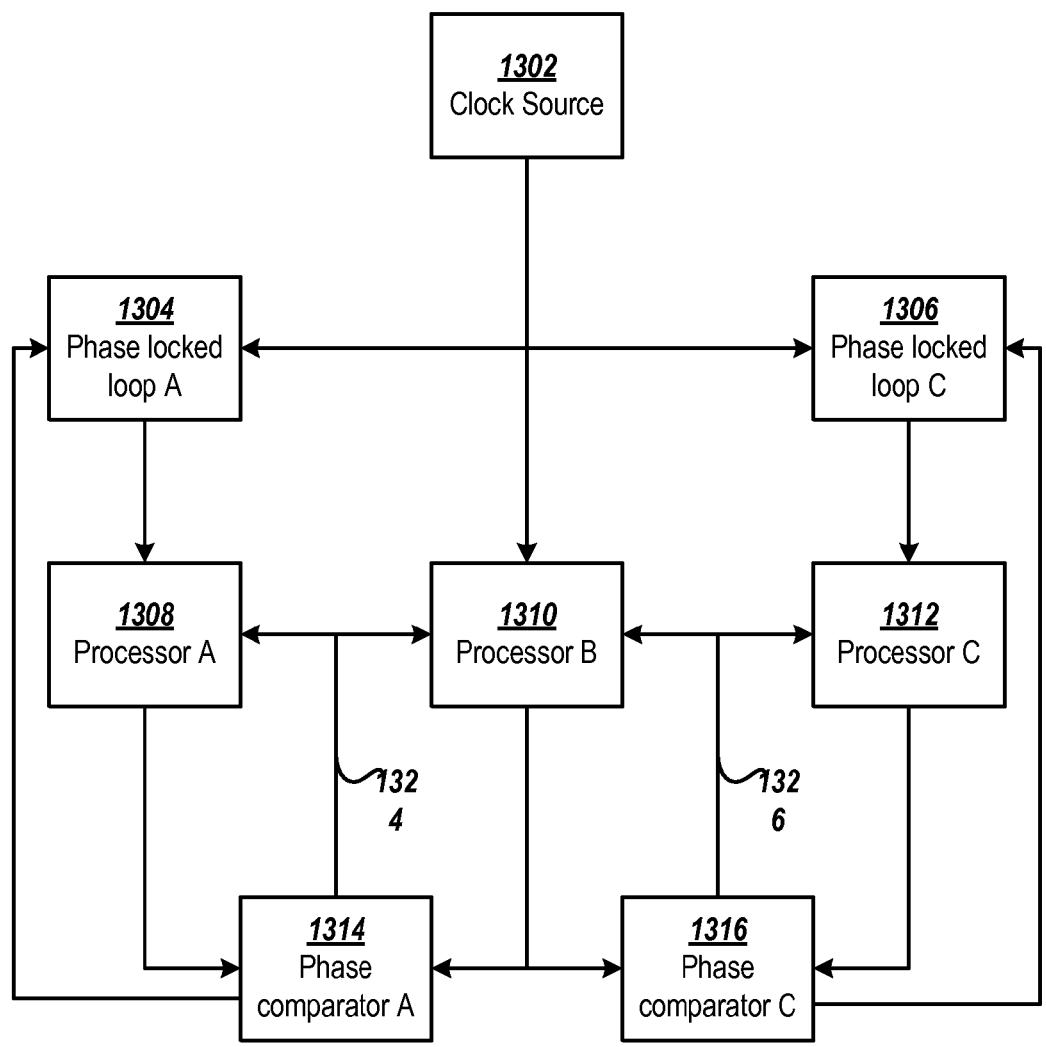
FIG. 13 shows a block diagram of a circuit for synchronizing three processors in accordance with various embodiments of the invention.

For example, FIG. 13 shows a block diagram of a circuit for synchronizing three processors in accordance with various embodiments of the invention. The circuit includes three processors A 1308, B 1310, and C 1312. An output of processor A 1308 and processor B 1310 are output to phase comparator A 1314. Phase comparator A 1314 determines a phase difference between the output of processor A and processor B and outputs the difference to phase-locked loop A 1304. Likewise, an output of processor B 1310 and processor C 1312 are each output to phase comparator C 1316. Phase comparator C 1316 determines a phase difference between the output of processor B 1310 and processor C 1312 and outputs the difference to phase-locked loop C 1306.

Phase locked loops receive a clock signal input from clock source 1302. Phase-locked loops 1304 and 1306 adjust the clock cycle input based on the phase differences received from respective phase comparator circuits 1314 and 1316. The adjusted clock signals are output from phase-locked loops 1304 and 1306 to processor A 1308 and processor C 1312 respectively. Communication lines (not shown) are also included for communicating sync requests and signals between the processors and phase comparator circuits in the manner discussed above.

Figure 14:
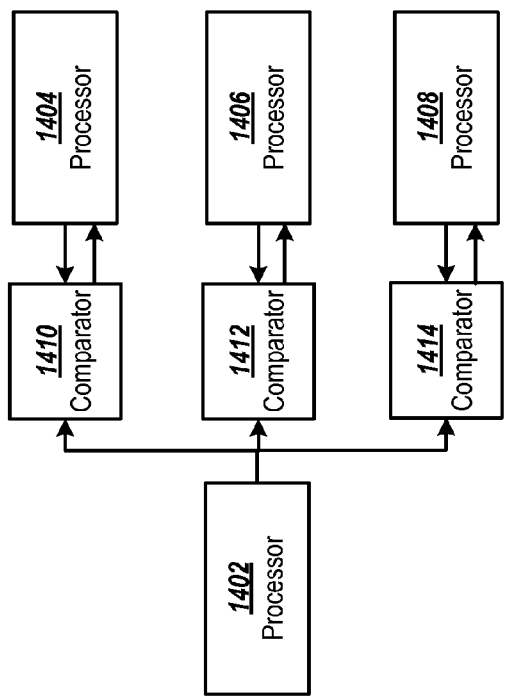
FIG. 14 shows a processor synchronization circuit arranged in a star configuration.

When more than three processors are synchronized, the circuit may be arranged in a number of ways to perform comparisons between processor outputs. For example, in one configuration, three or more processors may be compared and synchronized with a fourth processor in a star configuration. FIG. 14 shows a processor synchronization circuit arranged in a star configuration. In this configuration, three processors 1404, 1406, and 1408 are compared and synchronized with processor 1402 using respective comparators 1410, 1412, and 1414.

Figure 15:
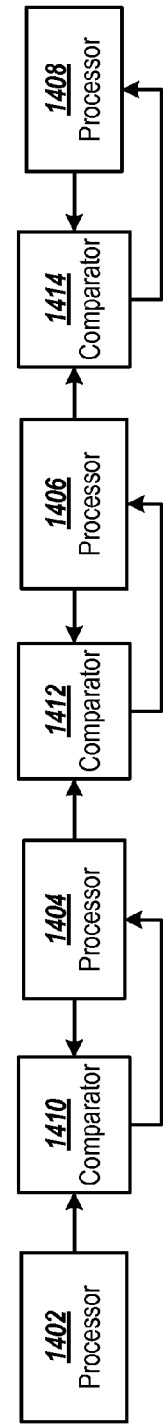
FIG. 15, shows a processor synchronization circuit arranged in a daisy-chain configuration.

In another configuration, the processors may be arranged in a daisy chain configuration. FIG. 15 shows a processor synchronization circuit arranged in a daisy-chain configuration. In this example, processor 1402 is compared with processor 1404 via comparator 1410. Comparator 1410 determines a phase difference and adjusts processor 1404 accordingly. Processor 1406 is "daisy-chained" with processor 1404 via comparator 1412. Similar to comparator 1410, comparator 1412 determines a phase difference between processors 1404 and 1406 and adjusts processor 1406 accordingly. In a similar manner, processor 1408 is daisy-chained with processor 1406 via comparator 1414.

When three or more processors are synchronized, a single or multiple phased comparator circuits may be used. If multiple phase comparator circuits are included, care should be taken to ensure that one phase comparator does not prematurely signal a subset of the processors that they are synchronized. In one possible implementation, output signal lines, which communicate synchronization status to processors, can be input to an AND gate and output from the AND gate to each of the processors. In another embodiment, the phase comparators can communicate status messages to each over a common bus in which status messages of each phase comparator is visible to each other phase comparator. Alternately, each processor may communicate with each other to determine when all processors have been synchronized.

Figure 16:
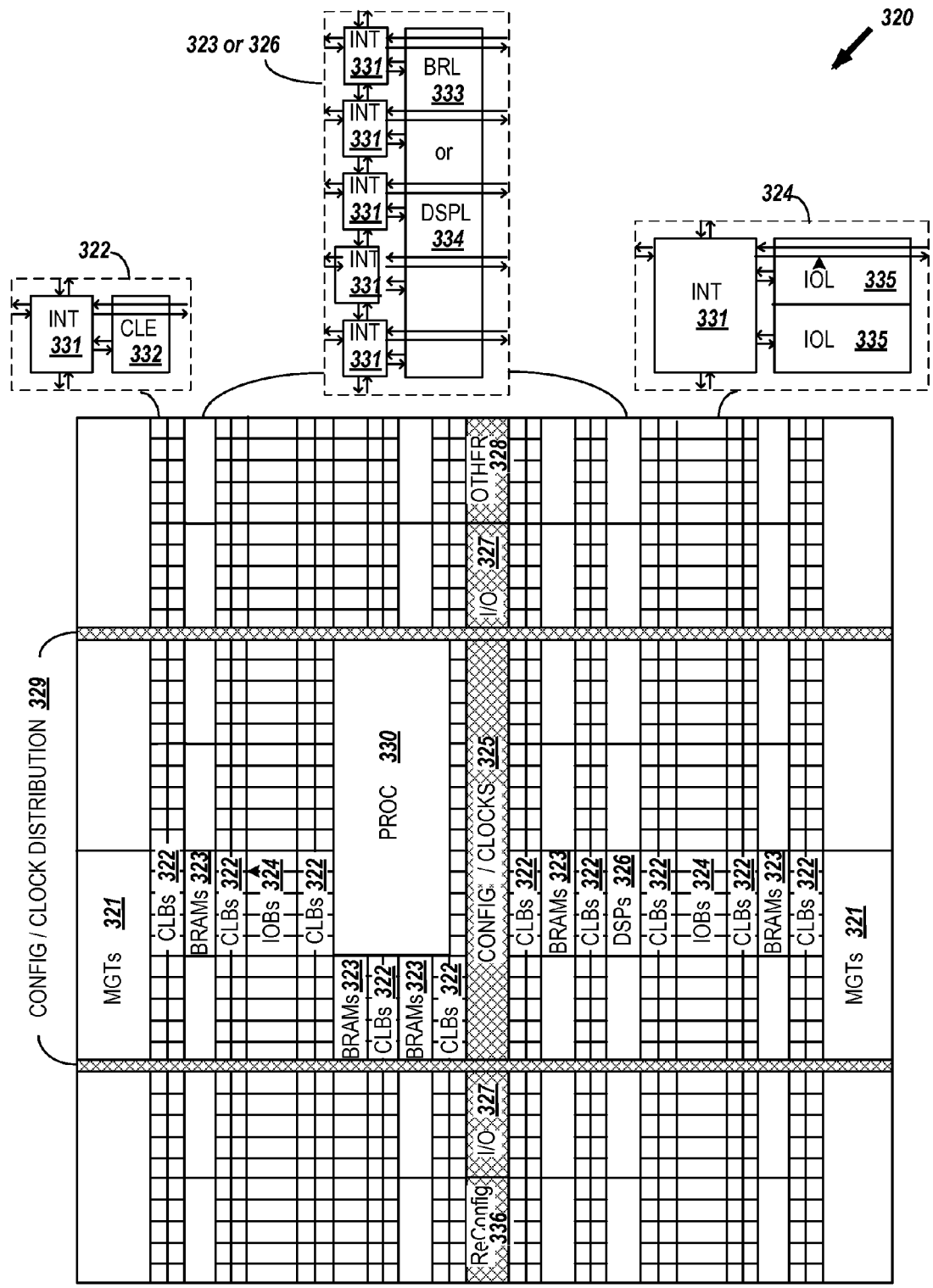
FIG. 16 is a block diagram of an example programmable integrated circuit that may be used in implementing several components including phase comparison and phase-locked-loop circuitry in accordance with various embodiments of the invention.

FIG. 16 is a block diagram of an example programmable integrated circuit that may be used in implementing several components including phase comparison and phase-locked-loop circuitry in accordance with various embodiments of the invention. Phase comparator circuits may be implemented on the programmable logic and interconnect resources of programmable integrated circuit.

FPGAs can include several different types of programmable logic blocks in the array. For example, FIG. 16 illustrates an FPGA architecture (320) that includes a large number of different programmable tiles including multi-gigabit transceivers (MGTs 321), configurable logic blocks (CLBs 322), random access memory blocks (BRAMs 323), input/output blocks (IOBs 324), configuration and clocking logic (CONFIG/CLOCKS 325), digital signal processing blocks (DSPs 326), a reconfiguration port (RECONFIG 336), specialized input/output blocks (I/O 327), for example, e.g., clock ports, and other programmable logic 328 such as digital clock managers, analog-to-digital converters, system monitoring logic, and so forth. Some FPGAs also include dedicated processor blocks (PROC 330).

In some FPGAs, each programmable tile includes a programmable interconnect element (INT 331) having standardized connections to and from a corresponding interconnect element in each adjacent tile. Therefore, the programmable interconnect elements taken together implement the programmable interconnect structure for the illustrated FPGA. The programmable interconnect element INT 331 also includes the connections to and from the programmable logic element within the same tile, as shown by the examples included at the top of FIG. 16.

For example, a CLB 322 can include a configurable logic element CLE 332 that can be programmed to implement user logic plus a single programmable interconnect element INT 331. A BRAM 323 can include a BRAM logic element (BRL 333) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 326 can include a DSP logic element (DSPL 334) in addition to an appropriate number of programmable interconnect elements. An 10B 324 can include, for example, two instances of an input/output logic element (IOL 335) in addition to one instance of the programmable interconnect element INT 331. As will be clear to those of skill in the art, the actual I/O pads connected, for example, to the I/O logic element 335 are manufactured using metal layered above the various illustrated logic blocks, and typically are not confined to the area of the input/output logic element 335.

In the pictured embodiment, a columnar area near the center of the die (shown shaded in FIG. 16) is used for configuration, clock, and other control logic. Horizontal areas 329 extending from this column are used to distribute the clocks and configuration signals across the breadth of the FPGA.

Some FPGAs utilizing the architecture illustrated in FIG. 16 include additional logic blocks that disrupt the regular columnar structure making up a large part of the FPGA. The additional logic blocks can be programmable blocks and/or dedicated logic. For example, the processor block PROC 330 shown in FIG. 16 spans several columns of CLBs and BRAMs.

Note that FIG. 16 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 16 are purely exemplary. For example, in an actual FPGA more than one adjacent column of CLBs is typically included wherever the CLBs appear, to facilitate the efficient implementation of user logic.

Those skilled in the art will appreciate that various alternative computing arrangements, including one or more processors and a memory arrangement configured with program code, would be suitable for hosting the processes and data structures of the different embodiments of the present invention.

Figure 17:
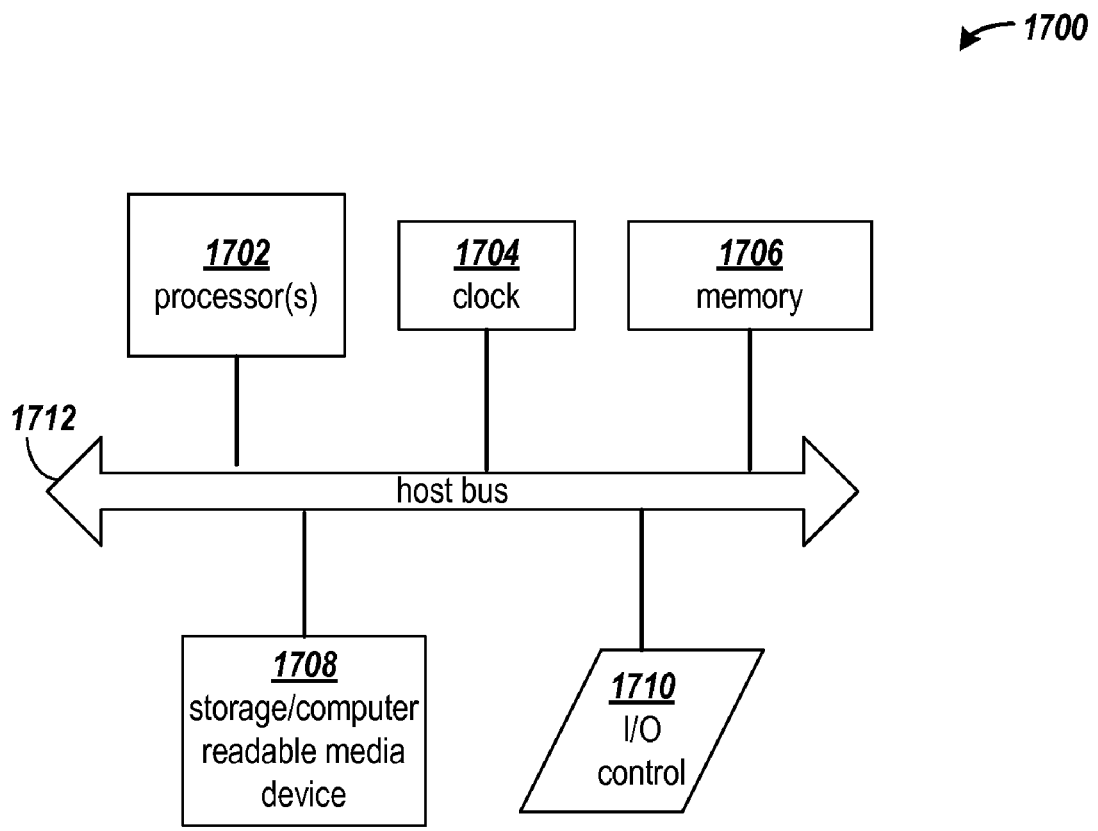
FIG. 17 is a block diagram of an example computing arrangement on which the processes described herein may be implemented.

FIG. 17 is a block diagram of an example computing arrangement on which the processes described herein may be implemented using a general purpose processor. Those skilled in the art will appreciate that various alternative computing arrangements, including one or more processors and a memory arrangement configured with program code, would be suitable for hosting the processes and data structures and implementing the algorithms of the different embodiments of the present invention. The computer code, comprising the processes of an embodiment of the present invention encoded in a processor executable format, may be stored and provided via a variety of computer-readable storage media or delivery channels such as magnetic or optical disks or tapes, electronic storage devices, or as application services over a network.

Processor computing arrangement 1700 includes one or more processors 1702, a clock signal generator 1704, a memory unit 1706, a storage unit 1708, and an input/output control unit 1710 coupled to host bus 1712. The arrangement 1700 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 1702 may be one or more general purpose processors, or a combination of one or more general purpose processors and suitable co-processors, or one or more specialized processors (e.g., RISC, CISC, pipelined, etc.).

The memory arrangement 1706 typically includes multiple levels of cache memory, and a main memory. The storage arrangement 1708 may include local and/or remote persistent storage such as provided by magnetic disks (not shown), flash, EPROM, or other non-volatile data storage. The storage unit may be read or read/write capable. Further, the memory 1706 and storage 1708 may be combined in a single arrangement.

The processor arrangement 1702 executes the software in storage 1708 and/or memory 1706 arrangements, reads data from and stores data to the storage 1708 and/or memory 1706 arrangements, and communicates with external devices through the input/output control arrangement 1710. These functions are synchronized by the clock signal generator 1704. The resource of the computing arrangement may be managed by either an operating system (not shown), or a hardware control unit (not shown).

One or more embodiments of the present invention is thought to be applicable to a variety of systems implementing synchronous circuits. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A circuit for synchronizing a first processor and a second processor, comprising:
   a first phase comparator having a first input coupled to an output of the first processor and a second input coupled to an output of the second processor;
   a first phase-locked loop circuit having an input coupled to a clock source generator, an output coupled to a clock input of the first processor, and a control input coupled to an output of the phase comparator; and
   wherein the first phase comparator is configured to selectably operate in one of a first mode or a second mode;
   wherein, while operating in the first mode, the first phase comparator:
      determines a first phase difference between synchronization waveforms output from the first and second processors;
      outputs a signal indicative of the first phase difference to the control input of the first phase-locked loop circuit; and
      in response to the first phase difference being less than a selected value:
         outputs a signal to the first and second processors indicating the first and second processors are synchronized; and
         enters the second mode; and
   wherein, while operating in the second mode, the phase comparator:
      determines a second phase difference between signals received by the first and second inputs; and
      in response to the second phase difference being less than a selected value, outputs a signal to the first and second processors indicating the first and second processors are synchronized.

2. The circuit of claim 1, wherein the first phase comparator enters the first mode of operation at startup.

3. The circuit of claim 1, wherein the first phase comparator enters the first mode of operation in response to a synchronization request received from one of the first or second processors.

4. The circuit of claim 1, wherein while operating in the first mode, the first phase comparator signals the first and second processors to output respective synchronization waveforms.

5. The circuit of claim 1, wherein while operating in the second mode, the first phase comparator outputs the determined second phase difference to the control input of the first phase-locked loop circuit.

6. The circuit of claim 1, wherein while operating in the second mode, the first phase comparator enters the first mode in response to the second phase difference being greater than or equal to a selected value.

7. The circuit of claim 1, wherein:
   the first phase comparator is further configured to selectably operate in a third mode;
   while operating in the second mode, the first phase comparator enters the third mode in response to a monitor-synchronization request signal from one of the processors;
   while operating in the third mode, the first phase comparator enters the first mode in response to a synchronize-request signal from one of the processors.

8. The circuit of claim 7, wherein the first phase comparator enters the third mode of operation at startup.

9. The circuit of claim 1, wherein the first phase-locked loop circuit is implemented within the first processor.

10. The circuit of claim 1, wherein the synchronization waveform is a square wave.

11. The circuit of claim 1, wherein the synchronization waveform is a digital waveform that encodes binary value greater than three.

12. The circuit of claim 11, wherein the first phase comparator is configured to:
    determine a direction to shift a phase-locked loop frequency; and
    output the determined direction to the control input of the first phase-locked loop circuit.

13. The circuit of claim 1, wherein the second processor has a clock input coupled to the clock source generator or an additional clock source generator.

14. The circuit of claim 1, further comprising:
    a second phase comparator having a first input coupled to an output of the second processor and a second input coupled to an output of a third processor;
    a second phase-locked loop circuit having an output coupled to a clock input of the third processor, and a control input coupled to an output of the second phase comparator; and
    wherein the second phase comparator is configured to selectably operate in one of the first mode or the second mode;
    wherein, while operating in the first mode, the second phase comparator:
       determines a second phase difference between synchronization waveforms output by the second and third processors;
       outputs a signal indicative of the second phase difference to the control input of the second phase-locked loop circuit; and
       in response to the second phase difference being less than the selected value:
          outputs a signal to the second and third processors indicating the second and third processors are synchronized; and
          enters the second mode; and
    wherein, while operating in the second mode, the second phase comparator:
       determines a third phase difference between signals received by the first and second inputs of the second phase comparator; and
       in response the third phase difference being less than a selected value, outputs a signal to the second and third processors indicating the first and second processors are synchronized.

15. A system for synchronizing multiple circuits, comprising:
    a phase comparator;

a first circuit having a plurality of outputs, including one or more outputs coupled to a first set of inputs of the phase comparator;

a second circuit having a plurality of outputs, including one or more outputs coupled to a second set of inputs of the phase comparator;

a timing adjustment circuit coupled to one or more inputs of the first circuit;

wherein the phase comparator:

determines a time-offset difference between the first set of inputs and the second set of inputs; and outputs the time-offset difference to the timing adjustment circuit; and wherein the timing adjustment circuit adjusts a signal output to the one or more inputs of the first circuit in response to the phase difference.

16. The system of claim 15, wherein:

the timing adjustment circuit includes a first set of programmable delay circuits coupled to the one or more inputs of the first circuit; and the phase comparator:

adjusts a delay parameter of the first set of programmable delay circuits using the time offset difference.

17. The system of claim 16, further comprising:

a second set of output programmable delay circuits coupled to one or more outputs of the first circuit; and wherein, the phase comparator adjusts a delay parameter of the second set of programmable delay circuits using the time offset difference.

18. The system of claim 15, wherein:

the first timing adjustment circuit is a phase-locked loop circuit having an input coupled to a first clock source generator, an output coupled to a clock input of the first circuit, and a control input coupled to an output of the phase comparator; and the phase-locked loop adjusts a clock signal output to the clock input using the time-offset difference.

19. A method of synchronizing a first circuit and a second circuit, comprising signaling the first and second circuits to each generate respective waveform outputs;

determining a phase difference between the generated waveform outputs from the first and second circuits;

adjusting a clock signal of the first circuit by an amount corresponding to the determined phase difference; and in response to the phase difference being less than a threshold value, signaling the first and second circuits to begin normal operation.

20. The method of claim 19, further comprising:

monitoring the first and second circuits by determining another phase difference between the generated waveform outputs from the first and second circuits; and adjusting the clock signal of the first circuit by another amount corresponding to the other determined phase difference.

* * * * *